July 22, 1924.
O. E. STOKES
1,502,358
AUTOMATIC SAFETY CLUTCH
Filed Jan. 4, 1923
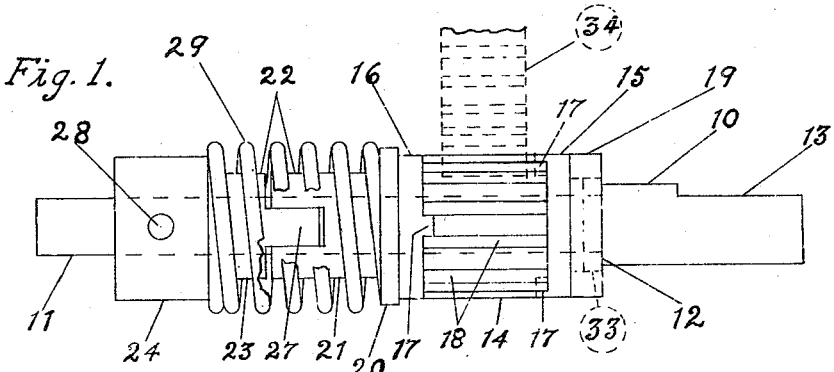
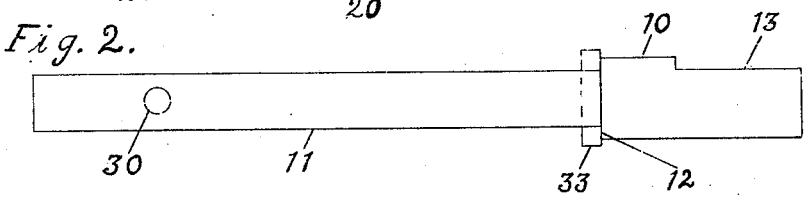
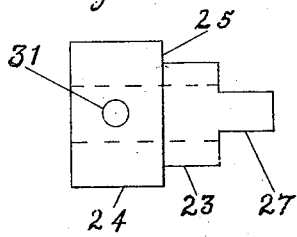
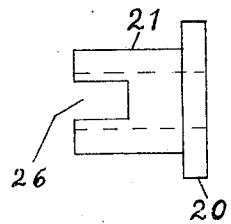
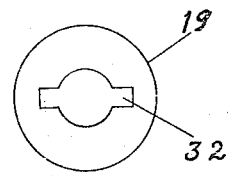
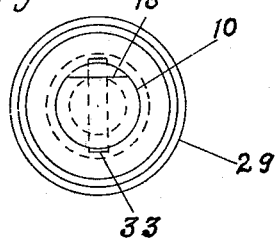
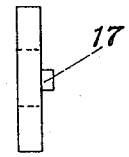
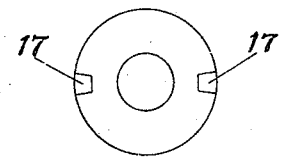
Inventor.
Oscar E. Stokes.
By Sprinkle Hopkins & McNair.
Attorneys Patented July 22, 1924.

1,502,358

UNITED STATES PATENT OFFICE.

OSCAR E. STOKES, OF STREATOR, ILLINOIS.

AUTOMATIC SAFETY CLUTCH.

Application filed January 4, 1923. Serial No. 610,734.

*To all whom it may concern:*

Be it known that I, OSCAR E. STOKES, a citizen of the United States, and resident of Streator, in the county of La Salle and State of Illinois, have invented certain new and useful Improvements in Automatic Safety Clutches.

The invention is more particularly directed to a clutch for driving mechanisms which are operated by an electric motor and is for the purpose of avoiding injury to the motor by overloading.

While my invention is adapted for use in a wide range of motor driven machines it is particularly adapted for use in motor driven washing machines of the type shown in my application Serial No. 605,759, filed December 9, 1922.

The primary object of the invention is to provide an improved spring actuated friction clutch.

Other objects of the invention will appear from the following specification, which is directed to the preferred embodiment of the invention, reference being had to the accompanying drawings forming a part of this specification, the novel features of the invention being more particularly pointed out in the appended claims.

Fig. 1 of the drawings is an elevation of the invention having a portion thereof broken away to more clearly show the underlying portions, and showing the gear in mesh with a fragmental portion of a gear to be driven by the device.

Fig. 2 is an elevation of the driving shaft showing the nonrotatable collar locking pin affixed thereto.

Fig. 3 is an elevation of the male portion of the sleeve clutch.

Fig. 4 is an elevation of the female portion of the sleeve clutch.

Fig. 5 is an elevation of the non-rotatable collar.

Fig. 6 is an end view of Fig. 1.

Fig. 7 is an edge view of one of the rotatable collars showing the studs for engaging the driving gear, and Fig. 8 is a side elevation view thereof.

Like reference characters refer to like parts throughout the several views of the drawings. Reference character 10 indicates the driving shaft having reduced portion 11 forming shoulder 12 intermediate the ends of the shaft. Driving shaft 10 also has cut-away portion 13 forming a flat surface adjacent the end thereof to receive a complementary female member in forming a coupling with a motor shaft. Rotatably mounted on the reduced portion 11 of the driving shaft 10 is driving gear 14 which lies between collars 15 and 16 which are rotatably related to the reduced portion 11 of the driving shaft 10. Collars 15 and 16 have studs 17 which lie between teeth 18 of the driving gear 14, thus locking the gear 14 to the collars 15 and 16. Collars 15 and 16 are adapted to have frictional engagement with nonrotatable collar 19 and flange 20 respectively, the flange 20 being formed integrally with the female portion 21 of the clutch sleeve designated generally by reference character 22. Collar 19 is recessed on its inner periphery as at 32 to receive therein pin 33 which passes through reduced portion 11 of driving shaft 10 and in alignment with shoulder 12 for locking collar 19 against rotation with relation to driving shaft 10 and flange 20 is adapted to rotate with female portion 21 of sleeve clutch 22 which interlocks with the male portion 23 thereof. The male portion 23 of the sleeve clutch 22 has formed integrally therewith and at its outer end flange 24 forming shoulder 25 and is nonrotatably secured to reduced portion 11 of shaft 10 by pin 28, which passes through bore 30 in the reduced portion 11 of shaft 10 and bore 31 in flange 24. The female portion 21 of sleeve clutch 22 has recess 26 formed in the inner end thereof for interlocking engagement with tongue 27 formed on the inner end of male portion 23 of the sleeve clutch 22, thus causing the two portions of the sleeve clutch to rotate in unison with the shaft 10. The female portion 21 of the sleeve clutch 22 is adapted to have a limited longitudinal movement on the reduced portion 11 of driving shaft 10 for frictionally engaging collar 16 with flange 20 under tension of the expansion spring 29. The helical expansion spring 29 is coiled about sleeve clutch 22 with one of its ends exerting an outward pressure against shoulder 25 formed by the flange 24 on the male portion 23 of the sleeve clutch 22 with its opposite end exerting an outward pressure against flange 20 of the female portion 21 of sleeve clutch 22, thus establishing frictional engagement between collar 16 and flange 20 and collars 15 and 19 under spring tension. Collars 15 and 16 being interlocked with gear 14 by studs 17 carried by the collars and lying between teeth 18 of gear 14 and collar 19 being secured by pin 33 to the reduced portion 11 of driving shaft 10, it will be seen that gear 14 will be frictionally held between collars 19 and 20 so that it will at all times tend to rotate with the shaft, but affording safety means as when the shaft 10 is directly connected with a motor, and to prevent overloading the motor in starting the shaft 10 may turn within the gear 14 until such time as the friction of the described clutch parts will be sufficient to impart normal rotation to the gear 34 of the washing machine and its connected operating parts.

In Fig. 1 of the drawings the gear 14 is shown as in mesh with gear 34. In associating gear 14 with a coacting gear the length of the teeth of the coacting gear must be sufficiently shorter than the length of the teeth of gear 14 to avoid interference by the lugs 17 of the collars 15 and 16 with the coacting gear.

My improved clutch is simple and economical to manufacture, is durable and not liable to get out of order, and is highly efficient for the described purposes.

It is not desired to be limited to the details of construction shown, except as set forth in the claims, for those skilled in the art may resort to various modifications of such details without departing from the purpose and spirit of my invention.

Having thus described my invention, what I claim is:

1. The combination with a shaft, a collar mounted on the shaft, a pin passing through the shaft and securing the collar against rotation, spaced apart collars rotatably mounted on the shaft, a gear intermediate the rotatable collars, studs carried by the rotatable collars and lying between the teeth of the gear, a sleeve clutch comprising coacting portions, flanges integral with the sleeve clutch portions, one of the sleeve clutch portions being adapted to have longitudinal movement on the shaft, and a spring supported by the sleeve clutch and adapted to force one of the flanges into engagement with one of the collars.

2. The combination with a shaft, a collar affixed to the shaft, spaced apart collars rotatably mounted on the shaft, a gear intermediate the rotatable collars, studs carried by the rotatable collars and lying between the teeth of the gear, a sleeve clutch comprising coacting portions, flanges integral with the sleeve clutch portions, one of the sleeve clutch portions being adapted to have longitudinal movement on the shaft, and the other of the portions being affixed to the shaft, and a spring supported by the sleeve clutch and adapted to force one of the flanges into engagement with one of the collars.

3. The combination with a shaft, a collar affixed to the shaft, spaced apart collars rotatably mounted on the shaft, a gear intermediate the rotatable collars, studs carried by the rotatable collars and lying between the teeth of the gear, a sleeve clutch comprising coacting portions, flanges integral with the sleeve clutch portions, one of the sleeve clutch portions being adapted to have longitudinal movement on the shaft, and a spring supported by the sleeve clutch and interposed between the flanges and adapted to force one of the flanges into engagement with one of the collars.

4. The combination with a shaft, a collar affixed to the shaft, spaced apart collars rotatably mounted on the shaft, a gear intermediate the rotatable collars, studs carried by the rotatable collars and lying between the teeth of the gear, a sleeve clutch comprising coacting portions, one of the portions being affixed to the shaft, flanges integral with the sleeve clutch portions, one of the sleeve clutch portions being adapted to have longitudinal movement on the shaft, and a spring supported by the sleeve clutch and adapted to force one of the flanges into engagement with one of the collars.

5. The combination with a shaft, a collar affixed to the shaft, spaced apart collars, rotatably mounted on the shaft, a gear intermediate the rotatable collars, studs carried by the rotatable collars and lying between the teeth of the gear, a sleeve clutch comprising coacting portions, a pin passing through one of the portions and the shaft, flanges integral with the sleeve clutch portions, one of the sleeve clutch portions being adapted to have longitudinal movement of the shaft, and a spring supported by the sleeve clutch and adapted to force one of the flanges into engagement with one of the collars.

6. The combination with a shaft, a collar affixed to the shaft, spaced apart collars rotatably mounted on the shaft, a gear intermediate the rotatable collars, studs carried by the rotatable collars and lying between the teeth of the gear, a sleeve clutch comprising coacting portions, a pin passing through one of the portions and the shaft, flanges integral with the sleeve clutch portions, one of the sleeve clutch portions being adapted to have longitudinal movement of the shaft, a spring supported by the sleeve clutch with its respective ends contacting with the respective flanges and adapted to force one of the flanges into engagement with one of the collars.

7. The combination with a shaft, a collar affixed to the shaft, spaced apart collars rotatably mounted on the shaft, a gear intermediate the rotatable collars, studs carried by the rotatable collars and lying between the teeth of the gear, a sleeve clutch comprising coacting portions, a pin passing through one of the portions and the shaft, flanges integral with the sleeve clutch portions, one of the sleeve clutch portions being adapted to have longitudinal movement of the shaft, a spring supported by the sleeve clutch with its respective ends contacting with the respective flanges and adapted to force one of the flanges away from the other.

8. The combination with a shaft having a reduced portion intermediate its ends, a shoulder formed by the reduced portion, a collar affixed to the shaft and contacting with the shoulder, spaced apart collars rotatably mounted on the shaft, a gear intermediate the rotatable collars, studs carried by the rotatable collars and lying between the teeth of the gear, a sleeve clutch comprising coacting portions, flanges integral with the sleeve clutch portions, one of the sleeve clutch portions being adapted to have longitudinal movement on the shaft, and a spring supported by the sleeve clutch and adapted to force one of the flanges into engagement with one of the collars.

In testimony whereof I have signed my name to this specification on this 30th day of December, A. D. 1922.

OSCAR E. STOKES.